(12) United States Patent
Maekawa et al.

(10) Patent No.: US 9,037,300 B2
(45) Date of Patent: May 19, 2015

(54) CONTROLLER FOR A MACHINE TOOL FOR EXECUTING TAPPING

(75) Inventors: Susumu Maekawa, Minamitsuru-gun (JP); Akihiko Fujimoto, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 578 days.

(21) Appl. No.: 13/401,925

(22) Filed: Feb. 22, 2012

(65) Prior Publication Data

US 2012/0296475 A1    Nov. 22, 2012

(30) Foreign Application Priority Data

May 18, 2011    (JP) .................................. 2011-111286

(51) Int. Cl.

| G05D 13/66 | (2006.01) |
|---|---|
| B23Q 15/12 | (2006.01) |
| G05B 19/16 | (2006.01) |
| G05B 19/416 | (2006.01) |

(52) U.S. Cl.
CPC ................ B23Q 15/12 (2013.01); G05B 19/16 (2013.01); G05B 19/416 (2013.01)

(58) Field of Classification Search
CPC .. G05B 19/19; G05B 19/416; G05B 19/4163; G05B 2219/43009; B23Q 15/12
USPC ......... 700/159, 160, 170, 173, 186, 188, 275; 318/569
See application file for complete search history.

(56) References Cited

U.S. PATENT DOCUMENTS

| 4,739,488 | A | * | 4/1988 | Asakura ........................ 700/179 |
|---|---|---|---|---|
| 4,972,322 | A | * | 11/1990 | Asakura et al. ............... 700/185 |
| 6,291,959 | B1 | * | 9/2001 | Yoshida et al. ............... 318/569 |
| 6,566,835 | B1 | * | 5/2003 | Yoshida et al. ............... 318/569 |
| 7,930,957 | B2 | * | 4/2011 | Travez et al. .................... 82/118 |
| 2003/0205984 | A1 | * | 11/2003 | Yoshida et al. ............... 318/801 |
| 2005/0137739 | A1 | * | 6/2005 | Yoshida et al. ............... 700/170 |
| 2005/0228533 | A1 | * | 10/2005 | Hioki et al. ................... 700/159 |

FOREIGN PATENT DOCUMENTS

| DE | 19905775 A1 | 8/2000 |
|---|---|---|
| DE | 69922952 T2 | 2/2006 |
| JP | 6-297250 | 10/1994 |
| JP | 7-112322 | 5/1995 |
| JP | 9-179623 | 7/1997 |
| JP | 2003-5836 | 1/2003 |
| JP | 2006-297506 | 11/2006 |

* cited by examiner

*Primary Examiner* — Charles Kasenge
(74) *Attorney, Agent, or Firm* — Drinker Biddle & Reath LLP

(57) ABSTRACT

A controller (10) for a machine tool (18) for tapping by a main shaft and a feed shaft, comprising an identifier unit (12) for identifying an index of the size of the tap, a temperature detector unit (19b) for detecting the temperature of a motor (19a) for the main shaft, an acceleration storage unit (21) for storing the acceleration of the main shaft corresponding to the index of the size of the tap, a rate storage unit (22) for storing the rate of varying the acceleration of the main shaft depending upon the temperature of the motor, and an acceleration calculation unit (16) for calculating a new acceleration of the main shaft by multiplying an acceleration determined from the index of the size of the tap and from the acceleration storage unit by a rate determined from the detected temperature and from the rate storage unit.

7 Claims, 7 Drawing Sheets

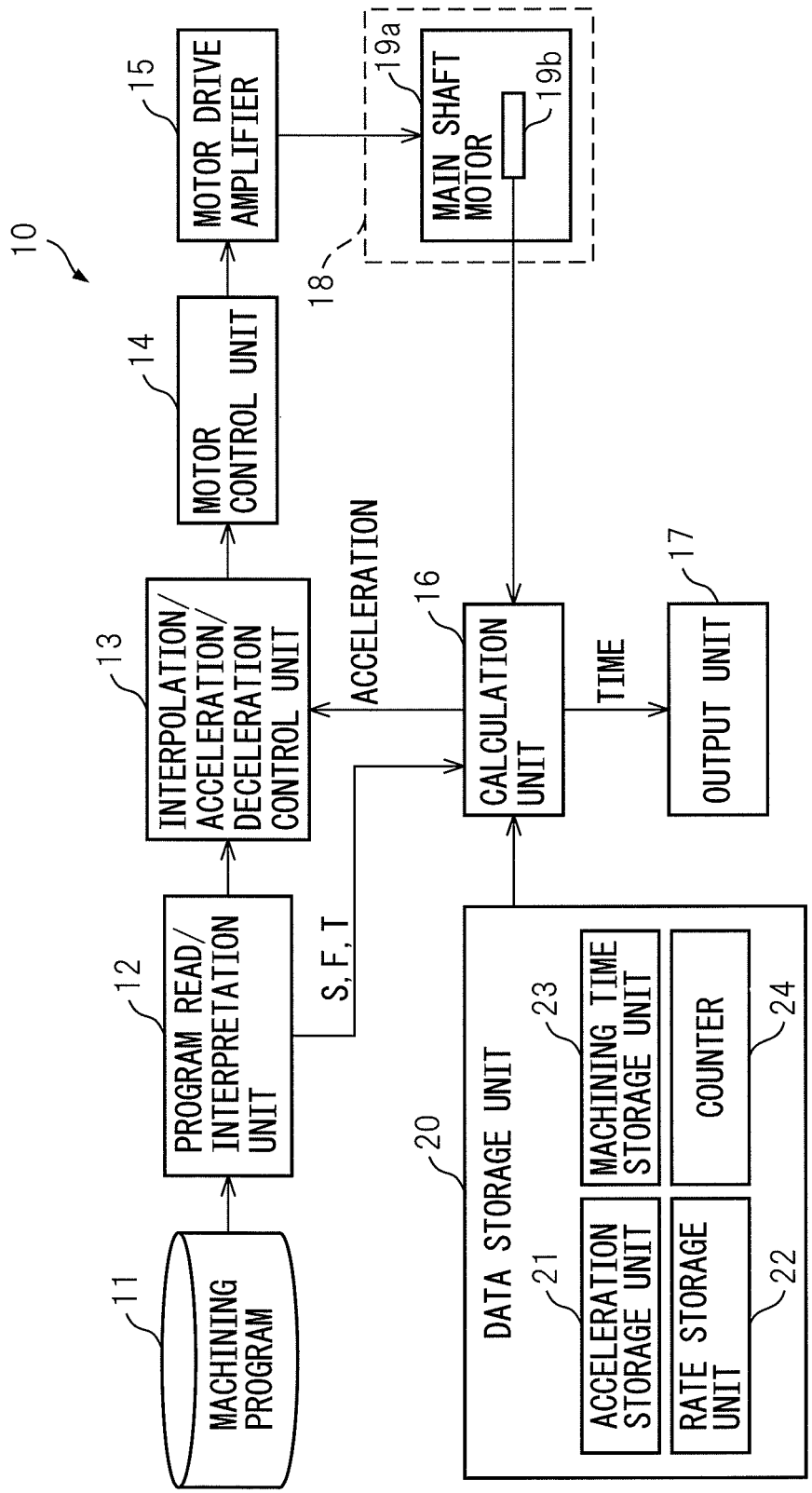

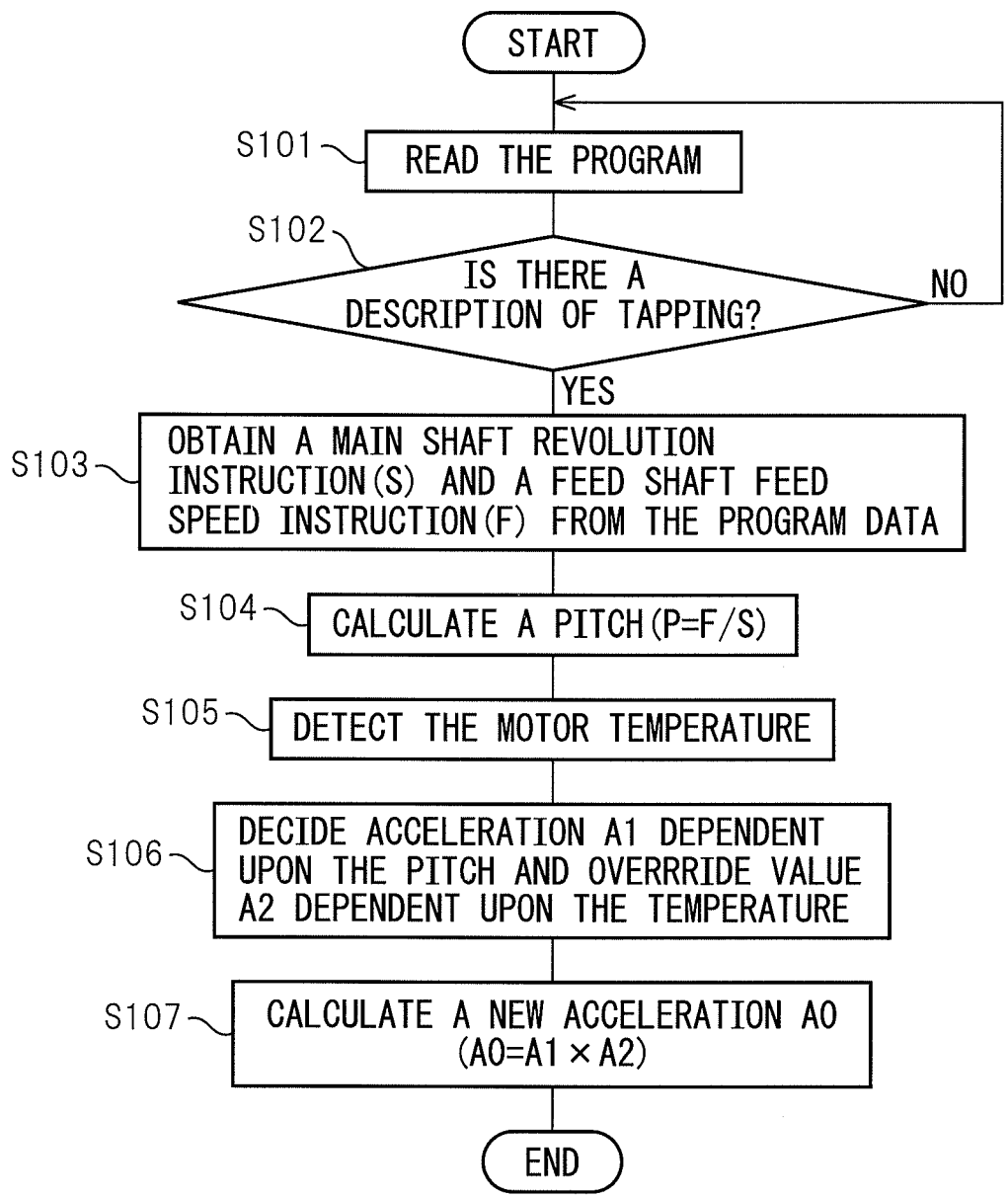

FIG.3A

| PITCH | ACCELERATION [rev/sec$^2$] |
|---|---|
| $P_0 \sim P_1$ | $A1_1$ |
| $P_1 \sim P_2$ | $\vdots$ |
| $\vdots$ | $\vdots$ |
| $P_{n-1} \sim P_n$ | $A1_n$ |

FIG.3B

| TEMPERATURE [°C] | OVERRIDE VALUE [%] |
|---|---|
| $TM_0 \sim TM_1$ | $A2_1$ |
| $TM_1 \sim TM_2$ | $\vdots$ |
| $\vdots$ | $\vdots$ |
| $TM_{n-1} \sim TM_n$ | $A2_n$ |

FIG.4A

| PITCH | ACCEL./DECEL. TIME CONST. [msec] |
|---|---|
| $P_0 \sim P_1$ | $A3_1$ |
| $P_1 \sim P_2$ | ⋮ |
| ⋮ | ⋮ |
| $P_{n-1} \sim P_n$ | $A3_n$ |

FIG.4B

| TEMPERATURE [°C] | OVERRIDE VALUE [%] |
|---|---|
| $TM_0 \sim TM_1$ | $A4_1$ |
| $TM_1 \sim TM_2$ | ⋮ |
| ⋮ | ⋮ |
| $TM_{n-1} \sim TM_n$ | $A4_n$ |

FIG.6A

| TOOL NUMBER | ACCELERATION [rev/sec$^2$] |
|---|---|
| $T_1$ | $A1_1$ |
| $T_2$ | ⋮ |
| ⋮ | ⋮ |
| $T_n$ | $A1_n$ |

FIG.6B

| TOOL NUMBER | ACCEL./DECEL. TIME CONST. [msec] |
|---|---|
| $T_1$ | $A3_1$ |
| $T_2$ | ⋮ |
| ⋮ | ⋮ |
| $T_n$ | $A3_n$ |

CONTROLLER FOR A MACHINE TOOL FOR EXECUTING TAPPING

RELATED APPLICATION DATA

This application claims priority under 35 U.S.C. §119 and/or §365 to Japanese Application No. 2011-111286 filed May 18, 2011, the entire contents of which is incorporated herein by reference.

BACKGROUND OF THE INVENTION

1. Field of the Invention

This invention relates to a controller for a machine tool which executes tapping by using a rotary main shaft to which a tap is attached and a feed shaft which feeds the main shaft.

2. Background Art

In a numerically controlled machine tool, attempts have been made to increase productivity by shortening the machining time by increasing the rate of acceleration/deceleration or by increasing a maximum speed of the motors that drive the feed shaft and the main shaft of the machine tool. However, when carrying out control in the above manner, a large electric current flows into the device for driving the shafts, comprising motors and amplifiers. In addition, the motors are accelerated and decelerated several times per unit of time and, as a result, the driving device generates heat. According to the prior art, if the temperature of the driving device rises to a predetermined temperature due to heat that is generated, the machine tool is halted and an alarm occurs, and thus is prevented from being damaged by heat.

However, if the machine tool is halted during the machining operation, the machining efficiency decreases and the machining is often defective. Further, when the machine tool is operated unattended, the machine tool must be restored by an operator; i.e., the machine tool may remain halted over extended periods of time. To avoid such inconveniences, acceleration has been set by maintaining a margin within a range of a maximum frequency of acceleration and deceleration per a predetermined unit time thereby to prevent the driving device from being overheated.

However, a rise in temperature of the driving device varies depending upon the weight and material of the workpiece, machining load and ambient temperature, and the driving device may be overheated even within a maximum number of accelerations and decelerations. Overheating may also similarly result when the machining is conducted in excess of the maximum number of accelerations and decelerations. Therefore, Japanese Unexamined Patent Publication (Kokai) No 2003-5836 and Japanese Unexamined Patent Publication (Kokai) No 9-179623 disclose devices or methods capable of continuing the operation of the driving device while preventing overheating.

Japanese Unexamined Patent Publication (Kokai) No 2003-5836 discloses controlling the output of the driving unit by limiting the acceleration if the temperature of the driving unit exceeds a predetermined temperature. Japanese Unexamined Patent Publication (Kokai) No 9-179623 discloses a method of controlling an acceleration/deceleration time constant of a feed shaft to a suitable value that will not cause overheating based on the temperature of the driving means and the frequency of acceleration and deceleration.

According to Japanese Unexamined Patent Publication (Kokai) No 2003-5836 and Japanese Unexamined Patent Publication (Kokai) No 9-179623, the acceleration is varied without varying the instructed feed speed of the driving device. Therefore, according to Japanese Unexamined Patent Publication (Kokai) No 2003-5836 and Japanese Unexamined Patent Publication (Kokai) No 9-179623, the machining can be executed without increasing the machining time. However, the acceleration varies irrespective of the content of machining since the acceleration is changed depending upon the temperature of the driving unit and the frequency of acceleration and deceleration.

Further, at the machining center, the heat generated at the time of acceleration and deceleration is, generally, larger in the main shaft than in the feed shaft. For example, the tapping, is executed by repeating the acceleration and deceleration of the main shaft, and heat generates in large amounts in the main shaft if the frequency of machining is large. Further, the tapping is conducted by bringing the main shaft in synchronism with the feed shaft necessitating acceleration and deceleration in most of the machining operation. Therefore, an increase in the acceleration of the main shaft is accompanied by not only an increase in the amount of heat that is generated but also an increased error in the synchronism relative to the feed shaft.

Further, a machining tool is often broken when executing the tapping of a small diameter. Further, if the acceleration is set to meet the tapping that requires machining precision or to meet the tapping of a small diameter, then the machining time increases and the machining efficiency may decrease.

The present invention was accomplished in view of the above circumstances, and has an object of providing a controller for a machine tool capable of preventing overheating and realizing optimum machining precision while preventing breakage of the tools.

SUMMARY OF THE INVENTION

To achieve the above object according to a first aspect of the invention, a controller for a machine tool which executes the tapping by using a rotary main shaft to which a tap is attached and a feed shaft which feeds the main shaft is provided, comprising:

an identifier unit for identifying an index of the size of the tap;

a temperature detector unit for detecting the temperature of a motor which drives the main shaft;

an acceleration storage unit for storing the acceleration of the main shaft corresponding to the index of the size of the tap;

a rate storage unit for storing the rate of varying the acceleration of the main shaft depending upon the temperature of the motor; and an acceleration calculation unit for calculating a new acceleration of the main shaft by multiplying an acceleration determined from the index of the size of the tap identified by the identifier unit and from the acceleration storage unit by a rate determined from the temperature detected by the temperature detector unit and from the rate storage unit.

According to a second aspect, the controller of the first aspect, wherein the index of the size of the tap is a pitch of the tap, and the identifier unit identifies the index of the size of the tap by calculating a pitch from a main shaft revolution instruction and a feed shaft feed speed instruction in a machining program of the machine tool is provided.

According to a third aspect, the controller of the first aspect, wherein the index of the size of the tap is a tool number of the tap, and the identifier unit identifies the index of the size of the tap by reading a tool number instruction in a machining program of the machine tool is provided.

According to a fourth aspect, the controller of any one of the first to third aspects is further provided comprising:

a machining time storage unit for storing the machining time required for executing the machining work one time for every work;

a counter for counting the present number of times of working; and an expected finishing time calculation unit for calculating the time required for finishing the machining work of a remaining number of times based upon a machining time of before the acceleration stored in the machining time storage unit is varied, upon a machining time of after the acceleration is varied, and upon the remaining number of times of working obtained by subtracting the present number of times of working counted by the counter from a predetermined total number of times of working.

These objects, features, advantages and other objects features and advantages of the invention will become obvious from the detailed description of representative embodiments of the invention shown in the accompanying drawings.

BRIEF DESCRIPTION OF THE DRAWINGS

FIG. 1 is a functional block diagram of a controller for a machine tool based upon the present invention;

FIG. 2 is a flowchart illustrating an operation of the controller based on a first embodiment of the present invention;

FIG. 3A is a diagram showing a relationship between the pitch of a tap and the acceleration;

FIG. 3B is a diagram showing a relationship between the temperature of a motor and the override value;

FIG. 4A is a diagram showing a relationship between the pitch of the tap and the acceleration/deceleration time constant;

FIG. 4B is a diagram showing a relationship between the temperature of the motor and the override value;

FIG. 6A is a diagram showing a relationship between the tool number of a tool for tapping and the acceleration;

FIG. 6B is a diagram similar to FIG. 4A and showing a relationship between the tool number of the tool for tapping and the acceleration/deceleration time constant.

DETAILED DESCRIPTION

Figure 5:
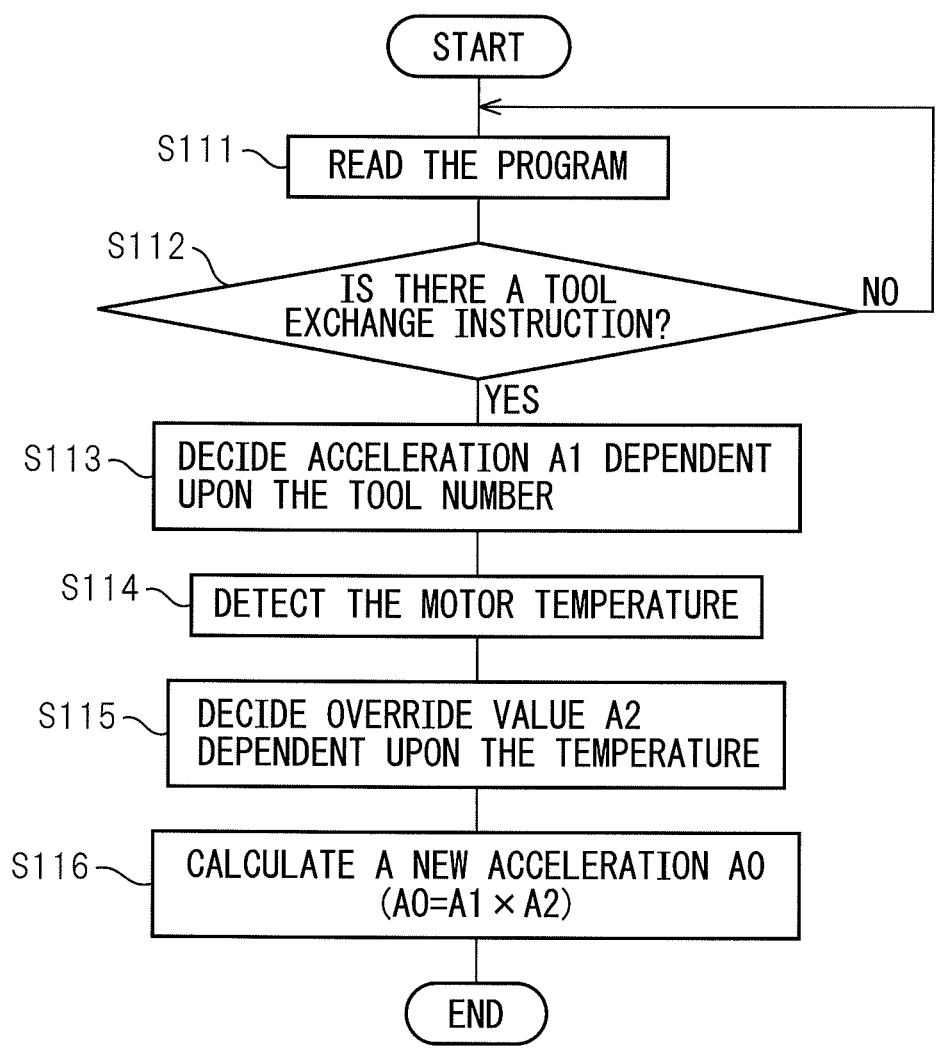
FIG. 5 is a flowchart illustrating a second operation of the control device based on a second embodiment of the present invention.

Embodiments of the invention will now be described with reference to the accompanying drawings. In the drawings, the same members are denoted by the same reference numerals. For easy comprehension, the drawings are suitably contracted.

FIG. 1 is a functional block diagram of a controller for a machine tool based upon the present invention. The controller 10 shown in FIG. 1 controls a machine tool 18 that executes the tapping. Therefore, a tap (not shown) is attached to a main shaft of the machine tool 18. The tap is rotated by a main shaft motor 19a that drives the main shaft, and is fed out by a feed shaft motor (not shown) that drives a feed shaft. In carrying out the tapping, the feed shaft operates in synchronism with the operation of the main shaft and is, therefore, automatically controlled upon controlling the main shaft motor 19a.

Referring to FIG. 1, the controller 10 is storing a plurality of machining programs 11 determined depending upon the kind of machining the workpiece. The controller 10 chiefly includes a program read/interpretation unit 12 for preparing program data by reading and interpreting the machining program 11, an interpolation/acceleration/deceleration control unit 13 for preparing position instruction data by interpolating the program data, a motor control unit 14 for preparing an operation instruction based on the position instruction data to drive the main shaft motor 19a of the machine tool 18, and a motor drive amplifier 15 which amplifies the operation instruction and feeds it to the main shaft motor 19a of the machine tool 18. The main shaft motor 19a is provided with a temperature detector unit 19b for detecting the temperature thereof.

The controller 10 further includes a calculation unit 16 for executing various arithmetic processings. A calculation unit 16 calculates a new acceleration of the main shaft motor 19a based on, for example, the index of the size of the tap and the temperature of the main shaft motor 19a, and notifies it to the interpolation/acceleration/deceleration control unit 13. When the acceleration of the main shaft motor 19a is varied, further, the calculation unit 16 is capable of calculating an expected finishing time required for finishing the machining work of a remaining number of times of working obtained by subtracting the present number of times of working from a predetermined total number of times of working. The controller 10, further, includes an output unit 17 such as a liquid crystal display or a printer for outputting the expected finishing time and various data.

Further, a data storage unit 20 in the controller 10 includes an acceleration storage unit 21 for storing, in the form of a map, a relationship between the pitch of the tap or the tool number of the machining tool and the acceleration or the acceleration/deceleration time constant. The data storage unit 20, further, includes a rate storage unit 22 for storing, in the form of a map, a relationship between the temperature of the main shaft motor 19a detected by the temperature detector unit 19b and the override value (rate of varying the acceleration). The data storage unit 20, further, includes a machining time storage unit 23 for storing the machining time required for executing the machining work one time, and a counter 24 for counting the present number C of times of working.

FIG. 2 is a flowchart illustrating an operation of the controller based on the first embodiment of the present invention. The operation of the controller 10 based on the first embodiment will now be described with reference to FIG. 2. It is presumed here that the operation according to the invention is carried out maintaining a predetermined control period when the machine tool 18 is machining a workpiece (not shown).

First, at step S101, the program read/interpretation unit 12 reads the machining program 11 and at step S102, it is confirmed if a description related to the tapping is present in the machining program 11.

If the description related to the tapping is present, the routine proceeds to step S103. If there is no such description, the routine returns back to step S101. At step S103, the program read/interpretation unit 12 obtains a main shaft revolution instruction S and a feed shaft feed speed instruction F from the program data that are prepared, and feeds them to the calculation unit 16.

Then, at step S104, the calculation unit 16 calculates a pitch P (=F/S) of the tap. At step S105, then, the temperature detector unit 19b detects the temperature TM of the main shaft motor 19a and feeds it to the calculation unit 16.

The temperature detector unit 19b may be incorporated in the main shaft motor 19a or may be provided near the main shaft motor 19a. Or, instead of directly detecting the temperature detector unit 19b, the temperature TM of the main shaft motor 19a may be estimated from an electric current flowing into the main shaft motor 19a.

Thereafter, at step S106, the calculation unit 16 decides an acceleration A1 which is determined depending upon the pitch and an override A which is determined depending upon the temperature. FIG. 3A is a diagram showing a relationship between the pitch of the tap and the acceleration. As shown in FIG. 3A, proper accelerations A1 relative to the pitch P of the tap are found in advance by experiment, and are stored in the form of a map in the acceleration storage unit 21 in the data storage unit 20.

As can be seen from FIG. 3A, the acceleration A1 relative to the pitch P of the tap is found for every predetermined range of the pitch. In FIG. 3A, it is presumed that the acceleration A1 increases with an increase in the pitch P. At step S106, the calculation unit 16 decides the acceleration A1 from the acceleration storage unit 21 based on the pitch P.

FIG. 3B is a diagram showing a relationship between the temperature of the motor and the override value. FIG. 3B is prepared in the same manner as FIG. 3A by conducting experiments. However, in FIG. 3B, the override value A2 decreases with an increase in the temperature TM of the main shaft motor 19a. In FIG. 3B, further, the upper limit of the override value A2 is 100%. At step S106, further, the calculation unit 16 decides the override value A2 from the rate storage unit 22 based upon the temperature TM.

Thereafter, at step S107, the calculation unit 16 calculates a new acceleration A0 (=A1×A2) based on the acceleration A1 and the override value A2. Finally, the thus calculated new acceleration A0 is fed to the interpolation/acceleration/deceleration control unit 13 to thereby drive the main shaft motor 19a of the machine tool 18 based on the new acceleration A0.

In the invention, the new acceleration A0 may be decided by using the acceleration/deceleration time constant instead of using the acceleration A1. FIG. 4A is a diagram showing a relationship between the pitch of the tap and the acceleration/deceleration time constant, the relationship being similarly stored in the acceleration storage unit 21. In FIG. 4A, it is presumed that the acceleration/deceleration time constant A3 decreases with an increase in the pitch P of the tap.

FIG. 4B is a diagram showing a relationship between the temperature of the motor and the override value, the relationship being similarly stored in the rate storage unit 22. In FIG. 4B, it is presumed that the override value A4 increases with an increase in the temperature TM of the main shaft motor 19a. In FIG. 4B, further, the lower limit value of the override value A4 is 100%. In this case, in the same manner as described with reference to FIG. 2, the calculation unit 16 decides the acceleration/deceleration time constant A3 from the acceleration storage unit 21, and decides the override value A4 from the rate storage unit 22 based on the temperature TM. Then the calculation unit 16 calculates a new acceleration/deceleration time constant A0' (=A3×A4). Thereafter, the new acceleration/deceleration time constant A0' is fed to the interpolation/acceleration/deceleration control unit 13, and the main shaft motor 19a of the machine tool 18 is driven based on the new acceleration/deceleration time constant A0'.

In the present invention as described above, an optimum acceleration or an optimum acceleration/deceleration time constant can be set depending upon the pitch of the tap. In other words, a relatively small acceleration (relatively large acceleration/deceleration time constant) is set when there is used a tap of a small diameter that is likely to cause the machining tool to be easily broken or when the machining requires a high precision, and a relatively large acceleration (relatively small acceleration/deceleration time constant) is set when the machining tool is not likely to be easily broken or when a high precision is not required for the machining.

Therefore, the present invention makes it possible to conduct the tapping maintaining good efficiency.

Further, the invention, determines the rate (override value) of varying the acceleration depending upon the temperature of the main shaft motor, and can easily prevent the machine tool from being overheated. Further, since a new acceleration is calculated by multiplying the acceleration by the rate, the new acceleration never becomes greater than the acceleration which is determined based only upon the pitch of the tap. Therefore, an optimum machining precision is realized while preventing the overheating and preventing the tool from being broken.

The embodiment described above with reference to FIGS. 3 and 4 has used the pitch of the tap as an index of the size of the tap. In practice, if the machining tool to be used is determined, then the size of the tap is decided. Therefore, according to a second embodiment of the invention, the tool number of the machining tool is used as an index of the size of the tap. FIG. 5 is a flowchart illustrating the operation of the controller according to the second embodiment of the present invention. Hereinafter, the operation of the controller 10 will be described based on the second embodiment with reference to FIG. 5.

First, at step S111, the program read/interpretation unit 12 reads the machining program 11 and at step S112, it is confirmed if a machining tool exchange instruction is present in the machining program 11.

If there is a description related to the exchange instruction, the routine proceeds to step S113. If there is no such description, the routine returns back to step S111. At step S113, the program read/interpretation unit 12 obtains the tool exchange instruction and feeds it to the calculation unit 16. Then the calculation unit 16 decides the acceleration A1 which is determined depending upon the tool number.

FIG. 6A is a diagram showing a relationship between the tool number of a tool for tapping and the acceleration. As shown in FIG. 6A, proper accelerations A1 for the tool number T of the machining tool are found in advance by experiment, and are stored, in the form of a map, in the acceleration storage unit 21 in the data storage unit 20.

Then, at step S114, the temperature detector unit 19b detects the temperature of the main shaft motor 19a and feeds it to the calculation unit 16. At step S115, an override value A2 is decided from the map in the rate storage unit 22 similar to the one shown in FIG. 3B. Finally, at step S116, the calculation unit 16 calculates a new acceleration A0 (=A1×A2) to thereby control the main shaft motor 19a in the same manner as described above.

FIG. 6B is a diagram similar to FIG. 4A and showing a relationship between the tool number of the tool for tapping and the acceleration/deceleration time constant. The calculation unit 16 decides an acceleration/deceleration time constant A3 from the map shown in FIG. 6B, and decides an override value A4 from the map in the rate storage unit 22 similar to the one shown in FIG. 4B. Thereafter, the calculation unit 16 calculates a new acceleration/deceleration time constant A0' (=A3×A4) to thereby drive the main shaft motor 19a in the same manner.

In this case, the acceleration or the acceleration/deceleration time constant can be set depending on the tool number of the tool for tapping. In other words, a small acceleration (large acceleration/deceleration time constant) is set for the tap of a small diameter that is likely to cause the tool to be broken or for the machining that requires a machining precision, and a large acceleration (small acceleration/deceleration time constant) is set for the machining that is not likely to cause the tool to be broken or for the machining that does require precision. Therefore, it will, be understood that the embodiment shown in FIGS. 5 and 6, too, makes it possible to carry out the tapping maintaining good efficiency.

Figure 7:
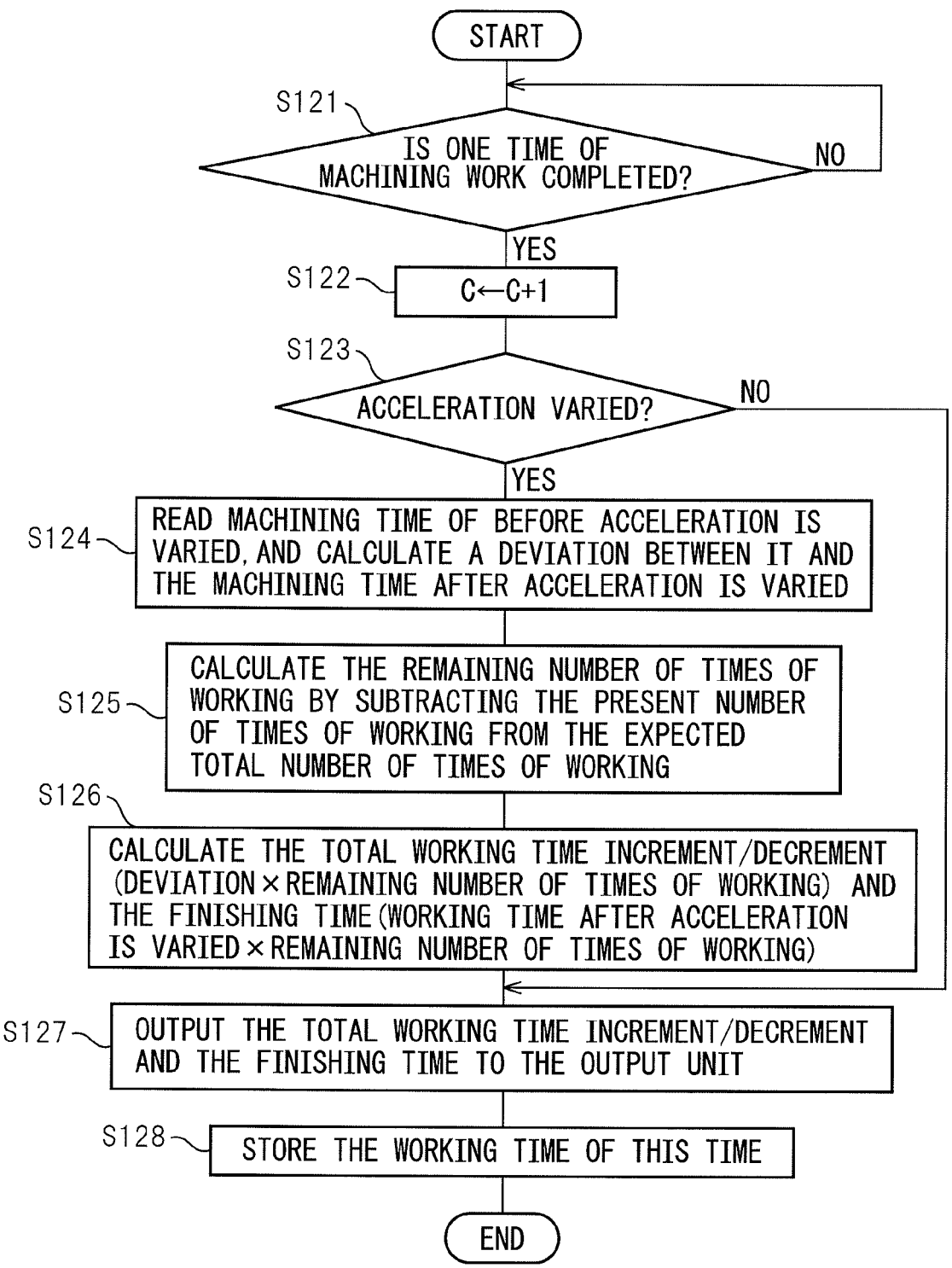
FIG. 7 is a flowchart illustrating the operation of the controller based on another embodiment of the present invention.

FIG. 7 is a flowchart illustrating the operation of the controller based on another embodiment of the present invention. The operation of the controller based on another embodiment of the invention will now be described with reference to FIG. 7.

First, at step S121, it is judged if one time of the machining work is completed for the workpiece (not shown). If the machining work has been completed, the routine proceeds to step S122 where "1" is added to the present number C of times of working of the counter 24.

Then, at step S123, it is judged if the acceleration is changed into a new acceleration A0, A0'. If changed into the new acceleration A0, A0', the routine proceeds to step S124. If not changed into the new acceleration A0, A0', the routine proceeds to step S128.

At step S124, the working time of the workpiece of one time of before changed into the new acceleration A0, A0' and the working time of the workpiece of one time of after changed into the new acceleration A0, A0', are read out from the working time storage unit 23. Then, the calculation unit 16 calculates a deviation Δt between these times of working.

Then, at step S125, the calculation unit 16 obtains the present number of times C of working from the counter 24, and subtracts this number of times of working from the predetermined expected total number C0 of times of working. The remaining number of times Cr of working is thus obtained.

Then, at step S126, the calculation unit 16 calculates a total working time increment/decrement by multiplying the deviation Δt by the remaining number of times Cr of working. Further, the calculation unit 16, calculates an expected finishing time by multiplying the working time of after changed into the new acceleration A0, A0' by the remaining number of times Cr of working.

At step S127, the total working time increment/decrement and the expected finishing time are output to the output unit 17 such as a liquid crystal display or a printer. When a predetermined pause time has been set to the machine tool 18, the calculation unit 16 calculates the expected finishing time to which the pause time has been added. Finally, the time required for the machining work of this time is stored in the machining time storage unit 23 to end the machining work (step S128).

In the embodiment described with reference to FIG. 7, the total machining time increment/decrement and the expected finishing time can be notified to the operator through the output unit 17. Therefore, the operator is allowed to properly grasp how the time is affected by a change in the acceleration. As a result, the operator is allowed to easily adjust the operation that will be executed after the machining is all finished, e.g., to easily adjust the schedule of operation for inspecting the workpieces and of operation for machining the workpieces of the next lot.

EFFECT OF THE INVENTION

According to the first aspect, the acceleration is varied by determining a rate based on the index of the size of the tap and the temperature of the main shaft motor. Therefore, a relatively small acceleration (relatively large acceleration/deceleration time constant) can be set for the cases where the tap of a small diameter is used that is likely to cause the machining tool to be broken or where the machining requires a high precision. When the machining tool is not likely to be broken or when the machining does not require a high precision, there can be set a relatively large acceleration (relatively small acceleration/deceleration time constant).

Specifically, since the rate (override value) for varying the acceleration is determined based on the temperature of the main shaft motor, the machine tool is easily prevented from being overheated. Besides, since the acceleration is varied by multiplying the acceleration by the rate, the new acceleration never exceeds the acceleration that is determined based only upon the index of the size of the tap. Accordingly, an optimum machining precision is realized while preventing the tool from being broken.

According to the second aspect, the acceleration can be correctly set by utilizing the pitch of the tap.

According to the third aspect, the acceleration can be easily and quickly set by utilizing the tool number of the tap.

The fourth aspect finds the expected finishing time of machining that varies as a result of setting a new acceleration. The expected finishing time can be notified to the operator through the output unit. Therefore, the operator is allowed to easily adjust the schedule of work such as inspection work that will be conducted after the end of the machining work.

Though the present invention has been described above by way of typical embodiments, a person skilled in the art will be able to further execute the above modifications as well as various other modifications, omissions and additions without departing from the scope of the invention.

The invention claimed is:

1. A device for controlling a machine tool which executes a tapping by using a rotary main shaft to which a tap is attached and a feed shaft which feeds the main shaft, the device comprising:
   a program reader for identifying an index of the size of said tap;
   a temperature detector for detecting the temperature of a motor which drives said main shaft;
   an acceleration storage for storing the acceleration of said main shaft corresponding to the index of the size of said tap;
   a rate storage for storing the rate of varying the acceleration of said main shaft depending upon the temperature of said motor; and
   an acceleration calculation unit operated on a processor of the device for calculating a new acceleration of said main shaft by multiplying an acceleration determined from the index of the size of said tap identified by said program reader and from said acceleration storage by a rate determined from said temperature detected by said temperature detector and from said rate storage.

2. The device for controlling a machine tool according to claim 1, wherein the index of the size of said tap is a pitch of said tap, and said program reader identifies the index of the size of the tap by calculating a pitch from a main shaft revolution instruction and a feed shaft feed speed instruction in a machining program of said machine tool.

3. The device for controlling a machine tool according to claim 1, wherein the index of the size of said tap is a tool number of the tap, and said program reader identifies the index of the size of the tap by reading a tool number instruction in a machining program of said machine tool.

4. The device for controlling a machine tool according to claim 1, further comprising:
   a machining time storage for storing the machining time required for executing a machining work one time;
   a counter for counting the present number of times of working; and an expected finishing time calculation unit operated on the processor of the device for calculating the time required for finishing the machining work of a remaining number of times based upon a machining time of before said acceleration stored in said machining time storage unit is varied, upon a machining time of after said acceleration is varied, and upon the remaining number of times of working obtained by subtracting the present number of times of working counted by said counter from a predetermined total number of times of working.

5. The device for controlling a machine tool according to claim 2, further comprising:
   a machining time storage unit for storing the machining time required for executing a machining work one time;
   a counter for counting the present number of times of working; and
   an expected finishing time calculation unit operated on the processor of the device for calculating the time required for finishing the machining work of a remaining number of times based upon a machining time of before said acceleration stored in said machining time storage unit is varied, upon a machining time of after said acceleration is varied, and upon the remaining number of times of working obtained by subtracting the present number of times of working counted by said counter from a predetermined total number of times of working.

6. The device for controlling a machine tool according to claim 3, further comprising:
   a machining time storage unit for storing the machining time required for executing a machining work one time;
   a counter for counting the present number of times of working; and
   an expected finishing time calculation unit operated on the processor of the device for calculating the time required for finishing the machining work of a remaining number of times based upon a machining time of before said acceleration stored in said machining time storage is varied, upon a machining time of after said acceleration is varied, and upon the remaining number of times of working obtained by subtracting the present number of times of working counted by said counter from a predetermined total number of times of working.

7. The device for controlling a machine tool according to claim 1, further comprising:
   an acceleration control unit operated on a processor of the device that receives the new acceleration from the acceleration calculation unit and provides for control signals so that the motor that drives the main shaft is accelerated in accordance with the new acceleration.

* * * * *